United States Patent
Cowelchuk et al.

(10) Patent No.: US 7,070,221 B2
(45) Date of Patent: Jul. 4, 2006

(54) AUTOMOTIVE INTERIOR TRIM COMPONENT WITH SOFT FEEL

(75) Inventors: Glenn A. Cowelchuk, Chesterfield Township, MI (US); Robert J. Adams, Ypsilanti, MI (US); Randy Reed, Fair Haven, MI (US); Michael P. Schoemann, Waterford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/708,500

(22) Filed: Mar. 8, 2004

(65) Prior Publication Data

US 2005/0194806 A1 Sep. 8, 2005

(51) Int. Cl.
*B60R 13/01* (2006.01)

(52) U.S. Cl. .............. 296/39.1; 296/153; 296/1.09

(58) Field of Classification Search ......... 296/1.09, 296/153, 39.1
See application file for complete search history.

(56) References Cited

U.S. PATENT DOCUMENTS

| | | | |
|---|---|---|---|
| 3,400,979 A | 9/1968 | James et al. | 297/421 |
| 4,456,644 A | 6/1984 | Janz et al. | 428/158 |
| 4,667,979 A | 5/1987 | Wolff | 280/752 |
| 4,781,956 A | 11/1988 | Zimmermann et al. | 428/43 |
| 4,783,114 A | 11/1988 | Welch | 296/153 |
| 4,810,452 A | 3/1989 | Taillefert et al. | 264/247 |
| 4,882,842 A | 11/1989 | Basson et al. | 29/657 |
| 5,040,335 A | 8/1991 | Grimes | 49/502 |
| 5,048,234 A | 9/1991 | Lau et al. | 49/502 |
| 5,071,605 A | 12/1991 | Kawaguchi et al. | 264/45.2 |
| 5,073,318 A | 12/1991 | Rohriach et al. | 264/46.5 |
| 5,178,807 A | 1/1993 | Thary | 264/46.4 |
| 5,181,759 A | 1/1993 | Doolittle | 296/153 |
| 5,224,299 A | 7/1993 | Abe | 49/502 |
| 5,387,390 A | 2/1995 | Kornylo | 264/46.8 |
| 5,445,430 A | 8/1995 | Nichols | 296/153 |
| 5,468,433 A | 11/1995 | Perry et al. | 264/46.4 |
| 5,536,351 A | 7/1996 | Rheinlander et al. | 156/212 |
| 5,571,597 A | 11/1996 | Gallagher et al. | 428/152 |
| 5,573,617 A | 11/1996 | Franck et al. | 156/196 |
| 5,590,901 A | 1/1997 | MacGregor | 280/728.3 |
| 5,626,382 A | 5/1997 | Johnson et al. | 296/146.7 |
| 5,663,210 A | 9/1997 | Sugimoto et al. | 521/81 |
| 5,692,711 A | 12/1997 | Tucker | 248/118 |
| 5,695,870 A | 12/1997 | Kelch et al. | 428/318.4 |

(Continued)

FOREIGN PATENT DOCUMENTS

EP 1182024 2/2002

(Continued)

OTHER PUBLICATIONS

Steven R. Sopher, *Advancements in Soft Polyolefin Bead Foams for Automotive Interior Trim Components*. Brochure, 2004, 10 pgs.

(Continued)

*Primary Examiner*—Dennis H. Pedder
(74) *Attorney, Agent, or Firm*—Wood Herron & Evans, LLP

(57) ABSTRACT

An automotive interior trim component includes a rigid substrate member that forms the structural support for the trim component. A portion of the substrate member has a thickness that is reduced relative to surrounding portions of the substrate member to define a target area for providing a soft feel to the trim component. The trim component may further include a flexible cover layer and a backing member disposed on a side of the substrate member opposite the cover layer. The substrate member and cover layer may be formed in a two-shot molding operation.

11 Claims, 2 Drawing Sheets

U.S. PATENT DOCUMENTS

| | | | |
|---|---|---|---|
| 5,709,925 A | 1/1998 | Spengler et al. | 428/198 |
| 5,738,810 A | 4/1998 | De Filippo | 264/46.7 |
| 5,792,413 A | 8/1998 | Ang et al. | 264/515 |
| 5,799,385 A | 9/1998 | Vecchiarino et al. | 29/469 |
| 5,803,415 A | 9/1998 | Konishi et al. | 248/18 |
| 5,810,388 A | 9/1998 | Berardi et al. | 280/728.3 |
| 5,816,609 A | 10/1998 | Gray et al. | 280/728.3 |
| 5,884,434 A | 3/1999 | Dedrich et al. | 49/503 |
| 5,951,094 A | 9/1999 | Konishi et al. | 296/153 |
| 5,952,630 A * | 9/1999 | Filion et al. | 200/5 R |
| 5,967,594 A | 10/1999 | Ramanujam | 298/153 |
| 5,976,289 A | 11/1999 | Kawakubo et al. | 156/78 |
| 5,995,380 A | 11/1999 | Maue et al. | 361/826 |
| 6,012,735 A | 1/2000 | Gray et al. | 280/728.2 |
| 6,013,210 A | 1/2000 | Gardner, Jr. | 264/40.1 |
| 6,017,617 A | 1/2000 | Gardner, Jr. | 428/309.9 |
| 6,070,905 A * | 6/2000 | Renault | 280/751 |
| 6,123,385 A | 9/2000 | Bailey et al. | 296/146.7 |
| 6,136,415 A | 10/2000 | Spengler | 428/157 |
| 6,168,188 B1 | 1/2001 | Preisler et al. | 280/728.3 |
| 6,185,872 B1 | 2/2001 | Seeberger et al. | 49/502 |
| 6,210,613 B1 | 4/2001 | Stein et al. | 264/45.4 |
| 6,213,538 B1 | 4/2001 | Scheidmantel et al. | 296/153 |
| 6,214,157 B1 | 4/2001 | Sjpengler | 156/304.6 |
| 6,217,098 B1 | 4/2001 | O'Brien et al. | 296/70 |
| 6,238,507 B1 | 5/2001 | Jones et al. | 156/224 |
| 6,248,200 B1 | 6/2001 | Dailey et al. | 156/245 |
| 6,248,205 B1 | 6/2001 | Scheidmantel et al. | 156/309.6 |
| 6,251,326 B1 | 6/2001 | Siano et al. | 264/328.8 |
| 6,319,438 B1 | 11/2001 | Smith et al. | 264/75 |
| 6,358,599 B1 | 3/2002 | Deibel et al. | 428/308.4 |
| 6,361,906 B1 | 3/2002 | Kawase et al. | 430/18 |
| 6,364,351 B1 | 4/2002 | Hier et al. | 280/732 |
| 6,368,093 B1 | 4/2002 | Vecchiarino et al. | 425/130 |
| 6,391,232 B1 | 5/2002 | Fritsch | 264/46.6 |
| 6,433,728 B1 | 8/2002 | Krupp et al. | 341/176 |
| 6,440,514 B1 | 8/2002 | Ueno et al. | 428/43 |
| 6,544,449 B1 | 4/2003 | Gardner | 264/46.5 |
| 6,568,707 B1 | 5/2003 | Hier et al. | 280/732 |
| 6,652,793 B1 | 11/2003 | Corrion et al. | 264/242 |
| 6,688,640 B1 | 2/2004 | Davis, Jr. et al. | 280/728.3 |
| 6,756,004 B1 | 6/2004 | Davis, Jr. et al. | 264/255 |
| 6,764,633 B1 | 7/2004 | Takahashi et al. | 264/259 |
| 6,872,673 B1 | 3/2005 | MacAulay | 442/152 |
| 6,893,077 B1 | 5/2005 | DeJongh | 296/187.05 |
| 6,899,363 B1 * | 5/2005 | Dry | 296/1.09 |
| 2001/0047899 A1 | 12/2001 | Ikeda | 180/90 |
| 2002/0043861 A1 | 4/2002 | Meadows | 297/411.21 |
| 2002/0066972 A1 | 6/2002 | Fritsch | 264/46.4 |
| 2002/0125734 A1 * | 9/2002 | Pokorzynski et al. | 296/146.7 |
| 2002/0153741 A1 | 10/2002 | Speelman et al. | 296/70 |
| 2003/0184064 A1 | 10/2003 | Hier et al. | 280/732 |
| 2003/0209888 A1 | 11/2003 | Davis, Jr. et al. | 280/728.3 |
| 2003/0209892 A1 | 11/2003 | Hier et al. | 280/732 |
| 2004/0119267 A1 | 6/2004 | Cowelchuck et al. | 280/728.3 |
| 2004/0119268 A1 | 6/2004 | Davis, Jr. et al. | 280/728.3 |
| 2004/0130051 A1 | 7/2004 | Cowelchuk et al. | |
| 2005/0200161 A1 | 9/2005 | Reed et al. | 296/153 |

FOREIGN PATENT DOCUMENTS

| | | |
|---|---|---|
| EP | 1580077 | 9/2005 |
| FR | 2796610 | 1/2001 |
| JP | 8011145 | 1/1996 |
| JP | 08183059 | 7/1996 |
| JP | 2003103676 | 4/2003 |

OTHER PUBLICATIONS

Abstract for Japanese Patent No. 2003103676 to Takahashi Kazunori for, *Resin Molded Member*, Published Apr. 9, 2003, 5 pages.

Abstract for Japanese Patent No. 8183059 to Ryoichi et al. for, *Skinned Resin-Molded Product and Manufacture Thereof*, Published Jul. 16, 1996, 4 pages.

U.S. Published Patent Application No. 200/O183897 to DePue for , *Two-Shot Co-Injected Automotive Interior Trim Assembly and Method*, Published Aug. 25, 2005.

United Kingdom Patent Office, *UK Search and Examination Report for Application No. 0520995.2*, Jan. 4, 2006, 6 pages.

* cited by examiner

AUTOMOTIVE INTERIOR TRIM COMPONENT WITH SOFT FEEL

CROSS-REFERENCE

The present invention is related to U.S. Ser. No. 10/708,561, filed Mar. 11, 2004, U.S. Ser. No. 10/708,315, filed Feb. 24, 2004, U.S. Ser. No. 10/709,382, filed Mar. 30, 2004, U.S. Ser. No. 10/710,305, filed Jul. 1, 2004, U.S. Ser. No. 10/904,008, filed Oct. 19, 2004, U.S. Ser. No. 10/904,010, filed Oct. 19, 2004.

FIELD OF THE INVENTION

The present invention pertains generally to automotive interiors, and more particularly to trim components for automotive interiors.

BACKGROUND OF THE INVENTION

It is known to outfit automotive interiors with various trim components to enhance the aesthetic appearance of the automotive interior and to provide comfort and convenience to vehicle occupants. Examples of these interior trim components include instrument panels, arm rests, door trim panels, and consoles. To increase the aesthetic appearance of the trim components and to improve the comfort and convenience to vehicle occupants, is often desired to form at least portions of the trim components with areas which are soft to the touch. Typically, these soft-feel areas have been formed by providing a resilient padding material beneath a pliable surface layer such as leather, vinyl, or fabric material.

One conventional method of forming trim components with padded material includes injecting foam material between a rigid substrate and a flexible skin layer joining the skin and substrate together. In another conventional method, a preformed, soft, resilient pad is secured to a rigid plastic shell and a pliable skin layer is stretched over the pad and secured to the shell to form the trim component. These prior methods of making automotive trim components are generally costly due to the need to handle multiple pieces and the multiple manufacturing steps required to make a padded trim component.

Various other trim assemblies have been manufactured using a two-shot molding process wherein a relatively soft skin layer is formed over a hard substrate material without padding. However, the trim panels produced by two-shot molding are relatively hard and unforgiving, compared to trim assemblies having foam layers and pads, and thus lack the improved aesthetics and comfort provided by padded trim assemblies. A need therefore exists for an automotive trim component which provides a soft feel comparable to trim components having padded materials, while further reducing manufacturing costs.

SUMMARY OF INVENTION

The present invention provides an automotive interior trim component having a target area for providing a soft feel to increase passenger comfort and aesthetic appearance of the trim component. The trim component may be an armrest, a door trim panel, an instrument panel, a console, or other interior trim items of a vehicle. In one embodiment, the trim component comprises a substrate member having a first thickness outside the target area, to provide structural support for the trim component, and a second thickness in the target area for providing the soft feel. The second thickness is less than the first thickness such that the substrate is pliable in the target area, and may be formed as a thin membrane for flash layer over the target area. A first side of the substrate may be formed with a texture that simulates a cover material.

In another embodiment, the trim component comprises a flexible cover layer formed over the first side of the substrate member, at least proximate the target area. Advantageously, the cover layer and that portion of the substrate member in the target area may be deflected under application of an external force, such as the pressure of a vehicle occupant's hand, to provide a soft feel to the trim component. The substrate member may be formed during the first shot of a two-shot molding process, and the cover layer may be formed over the substrate member during the second shot of the molding process.

In another embodiment, the trim component further includes a backing member, such as a compressible material or a cartridge having recesses, disposed on a second side of the substrate member, opposite the cover layer. As the cover layer and the portion of the substrate member in the target area are deflected under an external force, the backing member cooperates with the substrate member and cover layer to provide the soft feel. The backing member may be secured to the substrate by a backing member support fixed to the second side of the substrate member.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
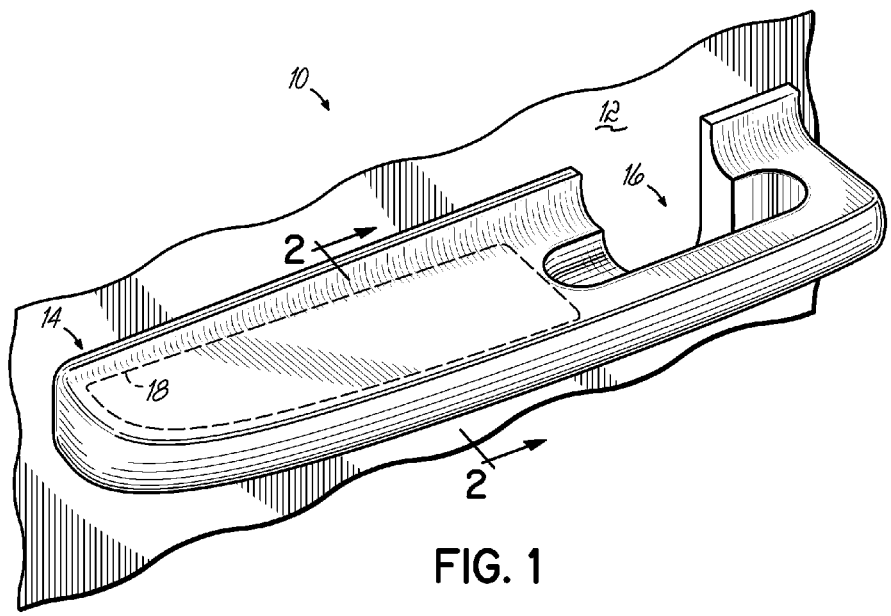
FIG. 1 is a perspective view of an exemplary automotive interior trim component according to the present invention, in the form of an armrest.

Referring to FIG. 1, there is shown an exemplary automotive interior trim component of the present invention, in the form of an armrest 10. The armrest 10 is attached to a vertical panel 12 within the interior of an automobile, such as a door panel. In the embodiment shown, the armrest 10 includes a first portion 14 providing a horizontal surface upon which a vehicle occupant may rest their arm. The armrest 10 may further include a handle portion 16 configured for grasping by a vehicle occupant to facilitate, for example, closing the door to which the armrest 10 is attached. The first portion 14 of the armrest 10 includes a target area 18 in which it is desired to provide a soft feel.

Figure 2:
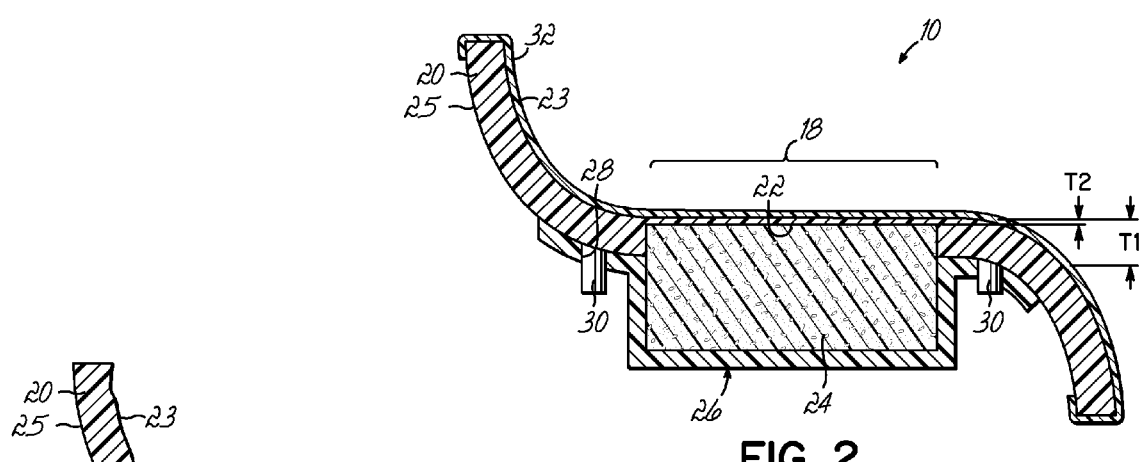
FIG. 2 is a cross-sectional view of the armrest of FIG. 1, taken along line 2—2.
Figure 3:
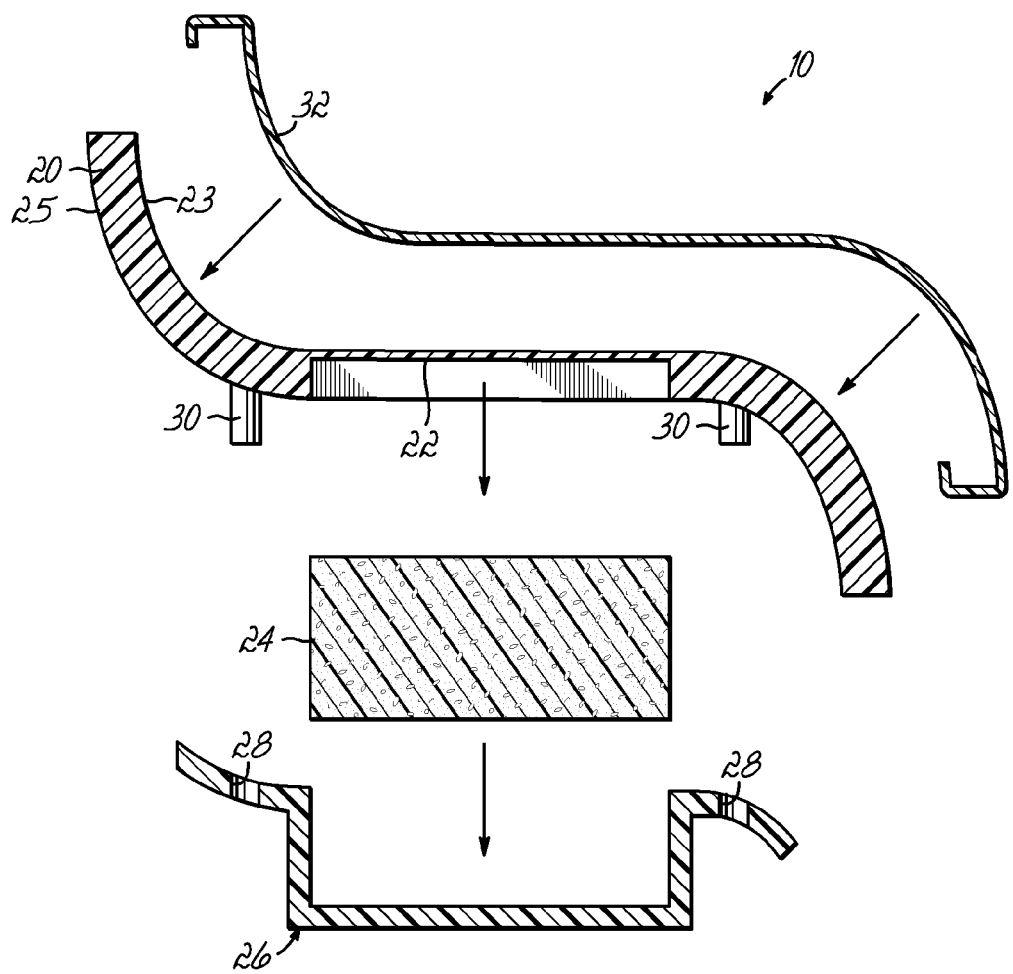
FIG. 3 is an exploded cross-sectional view of the armrest of FIG. 1.

Referring now to FIGS. 2 and 3, the armrest 10 includes a rigid substrate member 20 which forms at least part of the structural support of the armrest 10. A portion of the substrate member 20 in the target area 18 is formed as a thin flash layer or membrane 22 which is significantly thinner than the portions of the substrate member 20 surrounding the target area 18. In this manner, the substrate member 20 has a first thickness T1 outside the target area 18 which provides rigidity to the substrate member 20, and a second thickness T2 within the target area 18 that is reduced such that the substrate member 20 is pliable in the target area 18. It is this pliability of the target area 18 which helps to provide the soft feel to the armrest 10.

In the embodiment shown in FIG. 2, a backing member 24 is provided on a second side 25 of the substrate member 20 in the target area 18 to further enhance the soft feel of the armrest 10. In this embodiment, the backing member 24 is a foam bun which is secured to the second side 25 of the substrate member 20 by a backing member support 26 coupled to the second side 25 of the substrate member 20. Backing member support 26 has apertures 28 which are sized to fit over tabs 30 extending outwardly from the second side 25 of the substrate member 20. After the backing member support 26 has been fitted over the tabs 30, the tabs 30 may be staked over to retain the backing member support 26 adjacent the second side 25 of the substrate member 20. Alternatively, backing member support 26 may be secured to the second side 25 of the substrate member 20 by other methods, such as by adhesives, fasteners, R–F welding, or other methods suitable for securing the backing member support 26 to the substrate member 20.

The armrest 10 may further include a flexible cover layer 32 disposed over the first side 23 of the substrate member 20. The flexible cover layer 32 may comprise thermoplastic elastomer such as thermoplastic olefin or thermoplastic urethane, vinyl, leather, fabric, or other materials suitable for providing a flexible layer over the substrate member, as known in the art. Advantageously, the cover layer 32 and flash layer 22 are sufficiently flexible to deflect under the application of an external force, such as the pressure applied by the hand of a vehicle occupant, to compress the backing member 24. In this manner, the target area 18 of the armrest 10 is perceived to have a soft feel relative to portions of the armrest 10 outside the target area 18. Furthermore, the flash layer 22 provides a smooth transition between the rigid portions of the substrate member 20 outside the target area 18, and the soft feel area within the target area 18. While the flash layer 22 is depicted as having a uniform thickness extending continuously across target area 18, it will be recognized that the thickness of the flash layer 22 may vary, or may not extend completely across the target area 18.

In another embodiment, an automotive interior trim component, such as the armrest 10 of FIGS. 1 and 2 may be formed in a two-shot molding operation wherein the substrate member 20 is formed from a first polymeric material during a first shot of the molding operation. The substrate member 20 may be formed from thermoplastic olefin, acrylonitrile butadiene styrene, styrene maleic anhydride, polycarbonate/acrylonitrile butadiene styrene alloy, or other materials suitable for molding the rigid substrate member 20. The substrate member 20 is formed to have a flash layer 22 in a target area 18 for providing a soft feel to the interior trim component. A second material is injected to form a pliable cover layer 32 over the first side 23 of substrate member 20, at least proximate the target area 18, during the second shot of the molding operation. The cover layer 32 may be formed from vinyl, thermoplastic elastomer such as thermoplastic olefin or thermoplastic urethane, PVC, leather, cloth, or other suitable materials for forming a flexible cover 32 over the substrate member 20. After the substrate member 20 and cover layer 32 are molded, a backing member 24 is secured to the substrate member 20 in the target area 18 and on the second side 25 of substrate member 20, opposite the pliable covered layer 32. The backing member 24 may be secured to the substrate member 20 by a backing member support 26, as described above.

Figure 4:
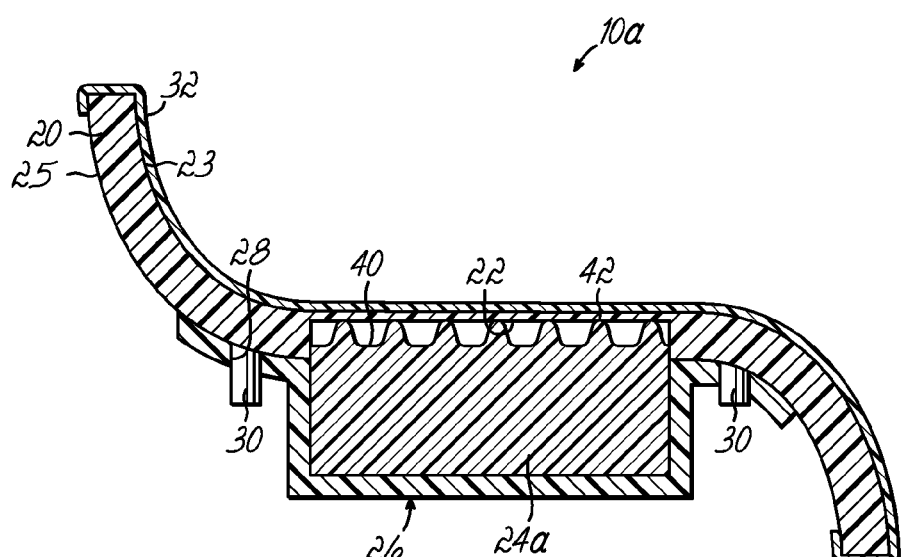
FIG. 4 is a cross-sectional view of another embodiment of the armrest of FIG. 1.

FIG. 4 depicts another embodiment of an armrest 10*a* according to the present invention, wherein like features have been similarly numbered. The armrest 10*a* shown in FIG. 4 is similar to the armrest 10 of FIG. 2, but the backing member 24*a* comprises a molded cartridge having a first side 40 with spaced, raised projections 42. When the cartridge is positioned beneath the target area 18, and secured with backing member support 26, the spaced, raised projections 42 permit the cover layer 32 and flash layer 22 to deflect between the projections 42 when a force is applied to the cover layer 32 to thereby provide a soft feel to the armrest 10*a*.

Figure 5:
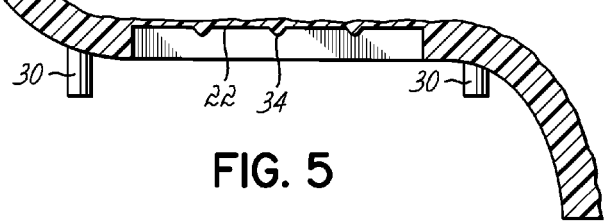
FIG. 5 is a cross-sectional view of another embodiment of an automotive interior trim component in the form of an armrest.

In another embodiment, depicted in FIG. 5, an automotive interior trim component, such as an armrest, may be provided as a substrate member 20 alone, without a backing member 24 or cover layer 32. In this embodiment, the flash layer 22 extends completely across the target area 18 and provides the soft feel by deflecting under the application of an external force applied to the target area 18. The first side 23 of the substrate member 20 may be formed with a texture which simulates a cover material, or a separate cover material 32 may be applied to the first side 23 of the substrate member 20 to improve the aesthetic appearance of the trim component. The substrate member 20 may further include strengthening ribs 34 or other reinforcing features provided on the second side 25, in the target area 18, to reinforce the flash layer 22, as shown in FIG. 5.

While the exemplary trim component has been shown and described herein in the form of an armrest 10, it will be recognized that the trim component may alternatively be provided in the form of other interior components, such as instrument panels or dashboards, consoles, door panels, or various other automotive trim components.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

The invention claimed is:

1. An automotive interior trim component, comprising:
    a substrate member adapted to support the trim component within the interior of an automobile, said substrate member having a first side and a second side, and having at least one target area for providing a soft feel to the trim component, said substrate member having a first thickness outside said target area such that said substrate member is not pliable outside said target area, and a second thickness within said target area that is reduced relative to said first thickness such that said substrate member is pliable in said target area.

2. The trim component of claim 1, wherein said first side of said substrate member is formed with a surface texture simulating a cover material for the trim component.

3. The trim component of claim 1, further comprising reinforcing ribs formed on the second side of said substrate member, proximate said target area.

4. The trim component of claim 1, further comprising a flexible cover layer disposed on said first side of said substrate member, at least proximate said target area.

5. The trim component of claim 4, further comprising a backing member disposed on said second side of said substrate member proximate said target area, said backing member cooperating with said cover layer and said target area of said substrate member to provide a soft feel to the trim component in said target area.

6. The trim component of claim 5, wherein said backing member comprises foam material.

7. An automotive interior trim component, comprising:
   a substrate member forming at least part of a structural support for the trim component, said substrate member having a first side and a second side, and having at least one target area for providing a soft feel to the trim component, said substrate member having a first thickness outside said target area to provide rigidity to said substrate member, and a second thickness within said target area that is reduced relative to said first thickness such that said substrate is pliable in said target area;
   a flexible cover layer disposed on said first side of said substrate member, at least proximate said target area; and
   a backing member disposed on said second side of said substrate member proximate said target area, said backing member cooperating with said cover layer and said target area of said substrate member to provide a soft feel to the trim component in said target area;
   wherein said backing member comprises a cartridge having a first side confronting said target area, said first side of said cartridge including spaced, raised projections such that said cover layer can deflect between said projections upon application of force to said cover layer.

8. The trim component of claim 5 further comprising a backing member support coupled to said second side of said substrate member and securing said backing member to said second side of said substrate member.

9. The trim component of claim 4, wherein said flexible cover layer is molded over said substrate member.

10. The trim component of claim 1, wherein said substrate member comprises an injection moldable polymer.

11. An armrest, comprising:
   a substrate member adapted to support the armrest within the interior of an automobile, said substrate member having a first side and a second side, and having at least one target area for providing a soft feel to the armrest, said substrate member having a first thickness outside said target area such that said substrate member is not pliable outside said target area, and a second thickness within said target area that is reduced relative to said first thickness such that said substrate member is pliable in said target area;
   a flexible cover layer disposed on said first side of said substrate member, at least proximate said target area;
   a foam backing member disposed on said second side of said substrate member proximate said target area, said backing member cooperating with said cover layer and said target area of said substrate member to provide a soft feel to the armrest in said target area; and
   a backing member support coupled to said second side of said substrate member and securing said backing member to said second side of said substrate member.

* * * * *